No. 621,257. Patented Mar. 14, 1899.
H. KRUIS & R. GALLÉE.
CLAMP.
(Application filed Apr. 16, 1898.)
(No Model.)

WITNESSES:
A. C. Connor
F. N. Wright

INVENTORS
HANS KRUIS AND RUDOLF GALLÉE
BY Howson and Howson
THEIR ATTORNEYS.

UNITED STATES PATENT OFFICE.

HANS KRUIS AND RUDOLF GALLÉE, OF VIENNA, AUSTRIA-HUNGARY.

CLAMP.

SPECIFICATION forming part of Letters Patent No. 621,257, dated March 14, 1899.

Application filed April 16, 1898. Serial No. 677,830. (No model.)

*To all whom it may concern:*

Be it known that we, HANS KRUIS and RUDOLF GALLÉE, subjects of the Emperor of Austria-Hungary, and residents of Vienna, in the Empire of Austria-Hungary, have invented certain new and useful Improvements in Clamps, of which the following is a specification.

The object of this invention is to provide a metal clamp which will insure a firm and tight joint in box-corners and other like joints of wood, board, leather, cardboard, and the like.

Figure 1:
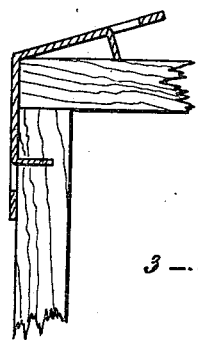
Figure 2:
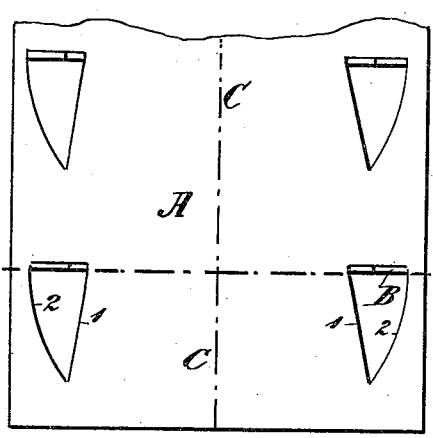
Figure 3:
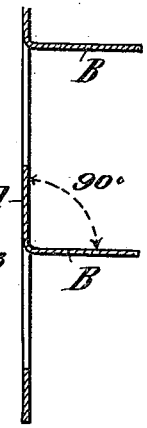
Figure 7:
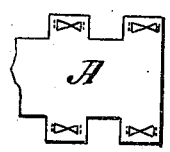
Figure 4:
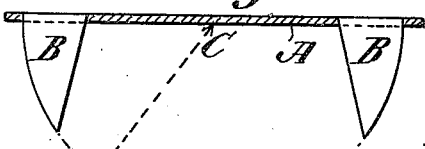
Figure 8:
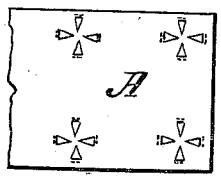
Figure 6:
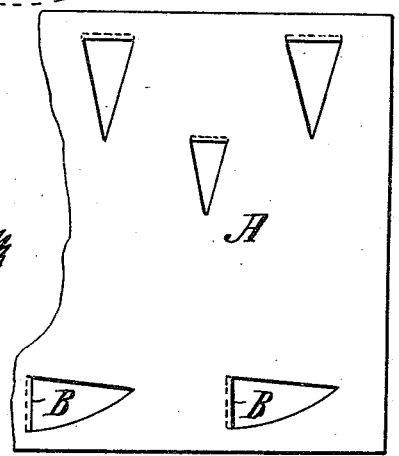
Figure 5:
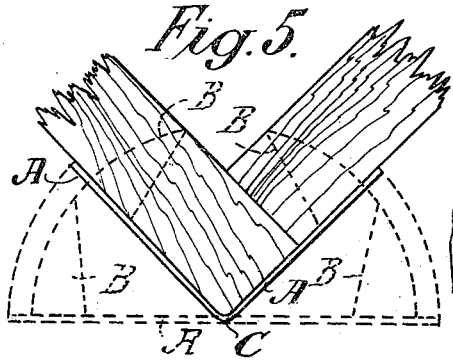

In the accompanying drawings, Figure 1 is a sectional view illustrating a common form of box-clamp. Fig. 2 is a face view of a clamp-plate embodying our invention. Figs. 3 and 4 are sectional views thereof at right angles to each other. Fig. 5 is a view showing how our improved clamp is applied to a box-corner. Figs. 6, 7, and 8 are views of modified forms of clamp-plates.

In using metal clamps for connecting pieces of wood, leather, pasteboard, and the like for making boxes and the like the joint is produced by points cut in and bent out of the edge or of the mass of the sheet-metal strips from which such clamps are made, the bases of such points being parallel to the longitudinal axis of the clamp—that is to say, to the line on which the clamp is bent in making an edge joint. This arrangement of the points renders these clamps unsuited for connecting heavier pasteboard plates and still more unsuited for connecting wooden boards, as in the manufacture of boxes, for which latter purpose this mode of connection would be particularly desirable on account of its simplicity, cheapness, and strength. If an edge joint has to be made by means of a metal clamp, then under the most favorable conditions the clamp-band may be applied to one of the surfaces to be connected, whereupon the points on one side of the clamp-band are driven into this surface. Afterward the clamp-band has to be bent along its longitudinal axis or line of bending in order to drive the points on the other side of the band into the other of the two surfaces to be connected, as shown in Fig. 1. The points meet such other surface at an oblique angle and are liable to be bent and distorted, as the sheet metal from which the clamp-bands are made is of necessity comparatively light. This diminishes not only the firmness, but also particularly the tightness of the connection. Moreover, if the material of the surfaces to be connected is of a fibrous structure and has a definite direction of the fibers—as, for instance, wood—then the connection of two such surfaces by means of clamp-bands with points arranged as heretofore practiced is possible only if the direction of the fibers—the "grain" of the material of both surfaces—is parallel to the edge in which both surfaces meet, because if the direction of the fibers is at right or oblique angles to such edge the points must be stiff enough to cut through the fibers transversely to the grain in being driven in without being bent. This, however, would require an utterly impracticable thickness of the sheet metal from which the clamp-band is made.

Now in the manufacture of wooden boxes it is absolutely impossible to always make the grain parallel to the edge at which any two surfaces meet. This condition is, on the contrary, fulfilled only for two edges out of eight in the ordinary wood boxes without cover. This latter difficulty has already been appreciated, and it has been proposed for the purpose of removing it to twist the points after stamping and bending them out of the plane of the strip, as shown in the British Patent No. 17,763, A. D. 1895. Obviously in this way satisfactory results could not be obtained because the stiffness of the points is materially impaired, so as to seriously interfere with driving them in properly. Further, the points are curved thereby, which makes it impossible to obtain a tight joint by the same, and, finally, the manufacture of these clamp-bands is by far too expensive.

According to the present invention all these difficulties are removed in the simplest and most economical manner.

The points in a clamp-band are obtained according to this invention by producing in a sheet-metal strip A two cuts 1 2, inclined to each other at a suitable angle and starting from one point, Fig. 2, the other ends of such cuts terminating on a straight line 3 3 at right angles to the longitudinal axis or bending-line C C of the sheet-metal strip. The tongues thus formed are then bent on the line 3 3—the base—so as to project at right angles from the plane of the strip A, Figs. 3 and 4.

Fig. 5 illustrates the modes of application of this clamp-band to an edge of a box or the like for making a joint. The clamp-band is placed with the bending-line C C onto the corner edge of the box, as shown in dotted lines in Fig. 5, and is then bent on this line, so that the points B enter into the surfaces to be connected, which in the case illustrated consist of wood. Now although the side edges of the points on their meeting the surfaces are inclined to the same at an oblique angle, yet an objectionable bending of the same cannot take place because owing to their shape the points offer a very great resistance to their being bent on a line at right angles to the line 3 3—their base—while neither the firmness of the joint nor its tightness is appreciably impaired if the points are bent on a line parallel to their base. The length of the points is preferably such that their ends slightly project from the inner side of the surfaces to be connected and are upset there. In order to increase the resistance of the points to their being bent on an axis at right angles to their base and to secure a perfectly tight joint, the outer side edge 2 of the points B is preferably curved on the arc of a circle the center of which is at the point of intersection of the base 3 3 of the point with the bending-line C C of the strip, as shown in Figs. 2, 4, and 5. On driving in points of this form the outer side edge 2 thereof has not to displace any material in the surface to be connected, as all points of the said edge move along one and the same arc of a circle, and, further, the points of this form perfectly fill out the space from which they have displaced any material of the surfaces to be connected on being driven in. Therefore no leakage whatever can occur. Such points the bases of which are at right angles to the bending-line may be provided on both sides of the clamp-band, as shown in Figs. 2 to 5; but with materials having a difinite grain it may happen that in one of the surfaces to be connected the grain is at right angles to the line on which such surfaces meet and in the other surface parallel thereto. The points for the latter surface then cannot be provided with bases at right angles to the bending-line C C, but must have bases parallel to such bending-line, as shown in Fig. 6. The points at the other side of the clamp-band are arranged as shown in Figs. 2 to 5.

Instead of single points groups of such points may be used, as shown in Figs. 7 and 8, the arrangement being such that the tongues from which such points are formed have their sharp ends directed toward each other before being bent up.

For materials without definite grain this arrangement of points is preferably combined with points arranged as usual—that is to say, with points having their bases parallel to the bending-line, as shown in Fig. 8—so that the bases of the points are on the sides of a square two of which are parallel to and two of which are at right angles to the bending-line. By this arrangement of points an extremely firm connection is obtained.

We claim as our invention—

1. A metal clamp for connecting edges of pieces of wood, leather, pasteboard and the like, by means of points provided on and bent out from such clamp, the characteristic feature of such clamp being that on at least one side of the bending-line C C the bases of all the points are at right angles to the bending-line, such points being cut and bent out from the mass of the band.

2. In a metal clamp having points cut out of and bent up from the metal lines at right angles to the bending-line of the clamp, the outer edges 2 of the points being curved on the arc of a circle, as and for the purpose described.

In testimony whereof we have signed our names to this specification in the presence of two subscribing witnesses.

HANS KRUIS.
RUDOLF GALLÉE.

Witnesses:
HENRY C. CARPENTER,
CHAS. E. CARPENTER.